Figure 1:
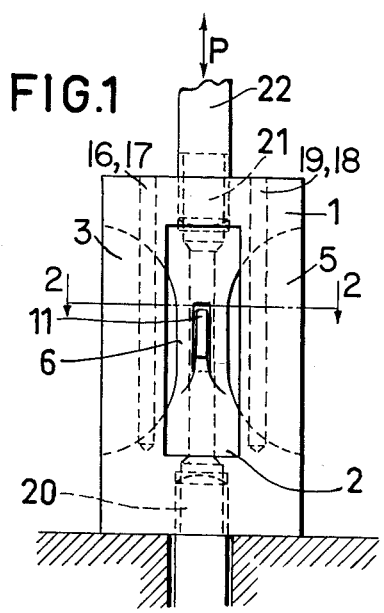

May 16, 1961     A. O. SÖDERHOLM     2,984,102

FORCE TRANSDUCERS

Filed Dec. 10, 1956

2,984,102
FORCE TRANSDUCERS

Arne Olof Söderholm, 7 Furusangsvagen, Bromma, Sweden

Filed Dec. 10, 1956, Ser. No. 627,177

Claims priority, application Sweden Dec. 13, 1955

9 Claims. (Cl. 73—141)

The present invention relates to the kind of force transducers which can be characterized as a spring balance, the resilience of which is measured by means of resistance strain gauges. Such strain gauges are included in an electric circuit which also contains an indicating member which gives an indication in response to the force acting upon the force transducers.

Such force transducers are already known in a number of different embodiments. When forming the resilient element one has, in most cases, tried to make this independent of force components which act in another direction than the force one desires to measure (lateral forces). To obtain this it has been tried, partly to make the strain gauge as stiff as possible in other directions than that in which the force acts, and partly to place the strain gauges at such places on the resilient elements where the lateral forces give a minimum of strain. Thus, with regard to one type of construction it has been tried to avoid the influence of the lateral forces by guiding a cylinder in the axial direction, for example through axial ball bearings, and by letting the cylinder end inwards towards the centre of the force transducer actuate a spring to which strain gauges are attached (U.S.A. Patent No. 2,472,047). Another construction consists of one or more cylinders or rods, one end of which is attached to a plate which cylinders or rods are actuated by the force in the axial direction and which to provide stiffness against lateral forces have a membrane attached to their free end, the said membrane being also attached to a tube provided round the cylinders. The other end of the tube is attached to the same plate as the cylinders (U.S.A. Patents 2,488,348 and 2,488,349). Still another construction consists of a circular tube which is actuated by the force in the direction of its longitudinal axis. This device is stiff against lateral forces, but strain gauges should be attached to the inner walls of the tube in order that a minimum influence of the lateral force shall be obtained (U.S.A. Patents 2,466,034 and 2,488,347). A fourth known construction consists of a ring or a ring-like body, which at two diametral points along the circumference thereof is actuated by the force, the strain gauges being attached to the circumference of the said rings (Swedish Patent 142,695, U.S.A. Patents 2,440,706 and 2,561,318). Of the said force transducer constructions all are difficult to produce except the tube, and great accuracy is required if independence of lateral forces shall be obtained. As to the tube the strain gauges, as already mentioned, should be fixed to the inner wall of the tube and at any rate to a curved surface. As to the strain gauges which are fit to this type of measuring this is a considerable complication, particularly in such cases when the tube is small in relation to the dimensions of the strain gauges.

The object of the present invention is to provide a force transducer of a simple construction which is particularly fit for great loads and which has but a slight sensitiveness to force components in another direction than that in which one desires to measure.

The force transducer according to the invention consists of a rod with a number of cavities in the axial direction in the sides of the rod. The depth of the cavities may for example amount to about the half or three fourths or seven eighths of the distance from the outer side to the centre of the rod. The said rod is in the axial direction exposed to that force component that one desires to measure. In the bottom of the cavities, i.e. as near the symmetrical longitudinal axis of the rod as possible, the strain gauges are so placed that they measure the tension or contraction in the rod in the axial direction. If the rod is also exposed to force components at right angles to the longitudinal axis (lateral forces), that is, for bending moments, then these force components give the greatest material stresses in the outer fibres of the rod, and the inner portion on which the strain gauges are placed, will be but slightly actuated by these stresses. Due to the form of the rod it will be stiff against lateral forces in relation to the stiffness in the axial direction, for which reason it can endure relatively great lateral forces without unallowed material stresses in the outer fibres arising. However, the action of the lateral forces on those surfaces on which the strain gauges are placed, is nearly eliminated, if several strain gauges are used and if they are placed symmetrically along the sides of the strain gauge (the bar), that is, if they are placed in such a manner that certain of them are exposed to stretching through lateral forces and other ones to contraction, whereby the total action can be reduced to zero.

Figure 2:
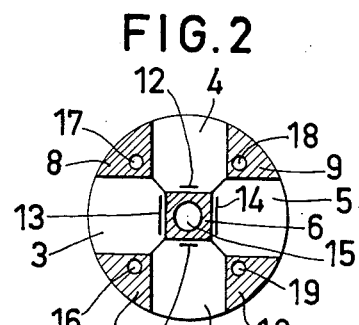
Figure 4:
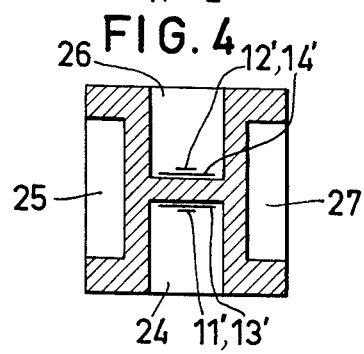
Figure 3:
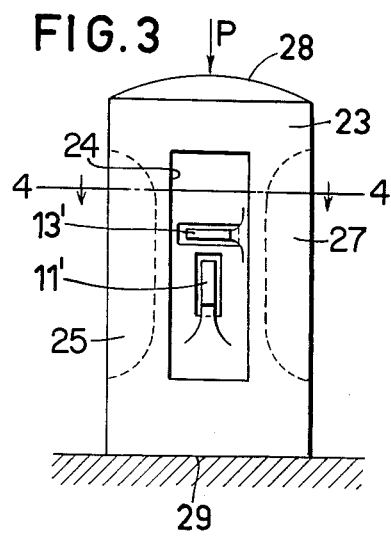
Figure 5:
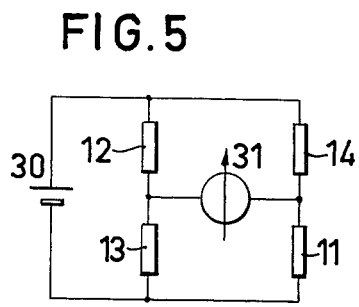

In the drawing examples are given of the force transducer according to the invention. Figs. 1 and 2 a side view and a cross section respectively are shown of an embodiment of the rod with the cavities arranged along the sides thereof, while Figs. 3 and 4 show a side view and a cross section respectively of another embodiment. Fig. 5 shows a circuit diagram for the strain gauges to obtain a minimum of influence of lateral forces.

According to Figs. 1 and 2 the force transducer consists of a cylindrical rod 1 having in its sides four cavities 2, 3, 4, 5 of equal width and vertically substantially circular-segment-shaped. The said cavities are so wide and so deep that they intersect with each other thus establishing a longitudinally extending inner rod portion 6 with square-shaped section in the centre of the cylinder. By letting the cavities have a constant depth on a certain portion in the longitudinal direction the centrally located rod portion 6 and the remaining rests of the outer edges 7, 8, 9, 10, of the cylinder will have a constant section along this said portion. To this portion of the exposed, centrally located square-shaped rod portion 6 a number of strain gauges 11—14 are attached. Two strain gauges 11, 12 provided on opposite sides of the bar have their wires running along the longitudinal axis of the rod portion 6, and the other two, 13, 14, have their wires running at right angles to the longitudinal axis. The strain gauges are connected in the manner shown in Fig. 5. As shown in Fig. 5, the electrical circuit is a Wheatstone bridge with one side of the bridge being constituted by gauges 12 and 13 connected in series and the other side of the bridge being constituted by gauges 11 and 14 connected in series. A source of power such as battery 30 is connected across each side of the bridge, and an indicating electric meter 31 is connected between the junctions of gauges 12—13 and 11—14 to read the unbalance produced in the bridge by stresses in the central rod portion 6. A hole 15 is made through the rod 1 along the line of symmetry of the force transducer and another one 16—19 through each outer section 7—10. The central hole 15 is threaded in the outer ends 20, 21 of the force transducer and a rod 22 is threaded into one end. The said holes 15—19 are made in order to obtain the smallest possible section area with the greatest possible stiffness against lateral forces, and the dimensions of the holes can be increased, after the strain gauges have been fixed, for the purpose of adjusting to a certain desired sensitivity of the force transducer. According to Figs. 3 and 4 the force transducer consists of a rectangular rod 23 having in its sides four cavities 24—27 of equal height and substantially constant depth, the said depth, however, being successively reduced in the end portions. One pair of oppositely disposed cavities, 24, 26 have a depth greater than one half the distance between the outer surface of the rod and the longitudinal axis thereof, and the other pair of oppositely disposed cavities 25, 27 arranged at right angles to the cavities 24, 26 have a depth less than that of the cavities 24, 26. The strain gauges 11'—14' are fixed to the bottom of the cavities 24 and 26. One strain gauge 11', 12' in each of the said cavities has its wires running in the axial direction of the cylinder, and the other two strain gauges 13' and 14' have their wires running at right angles to the axial direction. The function of the cavities 25 and 27 is to reduce the area without reducing the stiffness against lateral forces more than necessary. One end 28 of the force transducer is spherical, while the other end 29 is plane.

When measuring forces with the force transducer described above, the force or force component to be measured is so applied, that it acts in or near the axial symmetry line of the force transducer in such a direction that it either has a stretching or contracting action on the cylinder. To obtain this, the force P may for example be introduced, as in the first example of the embodiment of force transducer, via a rod 22 or, if it comes from a free body, via a plane surface thereon, to a spherical end 28 of the force transducer shown in Fig. 3, in which case only one force which acts contracting on the force transducer, can be measured.

For a force having the direction along the symmetry line according to the above and having a stretching action on the force transducer, the strain gauges 11 and 12 will be stretched and their resistance will be increased, while the strain gauges 13 and 14 will be contracted. If the strain gauges are connected in accordance with Fig. 5 to a bridge circuit with an electric power source 30 and an indicating member 31, the latter will indicate the changes of resistance of the strain gauges. For a force having the opposite direction the changes of resistance of the strain gauges will be opposite, and the indicating member will indicate an opposite direction of the change from the initial balance of the bridge.

If the force transducer is exposed to a bending moment, as for example a force directed at right angles to the line of symmetry of the cylinder, the point of attack being at the upper edge of the cylinder, the material stress will be nil in the material in the line of symmetry and for the rest proportional to the distance from the said line. Thus, the stress will be greatest in the outer sides of the cylinder and relatively slight in those surfaces on which the strain gauges are placed. If, for example, the force is directed at right angles to the plane of projection in Figs. 1, 2 and 3, and if the point of attack is at the upper end of the force transducer, then the fibres above the plane of projection will be contracted and the fibres below the plane of projection will be stretched. Then the resistance of the strain gauge 11 will be reduced and that of the strain gauge 12 will be increased. With the bridge circuit used the initial balance of the bridge will not be changed, if the strain gauges have the same gauge factor, that is, if they have the same ratio between change of resistance and stretching. For the strain gauges 13' and 14' the condition, with regard to the embodiment according to Figs. 3 and 4, will be similar to the conditions as regards the strain gauges 11 and 12, the changes of resistance, however, being opposite to those of the strain gauges 11 and 12. As regards the embodiment according to Figs. 1 and 2 the strain gauges 13 and 14 will lie at right angles to that line of symmetry in which the material stress is zero and about which it changes its sign.

The changes of resistance of those parts of the strain gauges which are exposed to contraction or stretching will be equal for reasons of symmetry, and therefore the resultant change of resistance will be zero or if the strain gauges are located asymmetrically, near zero. Thus, the force transducer is but slightly sensible to a transverse force in the direction stated. If the transverse force acts at right angles to the line of symmetry of the cylinder but along the plane of projection, then the strain gauges 11 and 12 will extend symmetrically across the line of symmetry, like the strain gauges 13 and 14 in the former case with regard to the embodiment according to Figs. 1 and 2, and therefore the resultant changes of resistance in the strain gauges 11 and 12 will be very slight. The strain gauges 13 and 14 will, as far as this direction of the transverse force is concerned, in the embodiment according to Figs. 1 and 2 show changes of resistance as the strain gauges 11 and 12 in the former case, while in the other embodiment they lie across the line of symmetry as the strain gauges 11 and 12. Thus the force transducer is very insensitive to forces in tangential direction with regard to the line of symmetry, partly owing to how the strain gauges are placed in relation to the line of symmetry, and partly owing to the fact that these forces cause but a slight material stress in those surfaces to which the strain gauges are attached. The latter is important, partly owing to the fact that it is impossible to place the strain gauges exactly where desired, and partly owing to imperfections of the strain gauges or heterogeneity of the material of the cylinder.

What I claim is:

1. An arrangement for reducing the influence of lateral forces on a load receiving element for use in a force transducer for measuring tensile and compressive forces by means of strain gauges connectable to a power source and to an electrical indicating member, said load receiving element comprising a rod provided with at least one pair of oppositely disposed cavities extending longitudinally of said rod, said cavities having a depth of at least one half the distance between the outer surface of said rod and the longitudinal axis thereof and which produce between their bottom faces a central rod portion and at least two outer portions between said cavities as seen in a transverse direction, the end portions of said cavities being of less depth than the central portions thereof and the end portions of said cavities having a progressively changing depth, and the strain gauges being disposed only on said central portion of said rod.

2. A load receiving element as defined in claim 1 wherein said rod as a whole is circular in transverse configuration.

3. A load receiving element as defined in claim 1 wherein holes are provided therein and which extend longitudinally of the axis through said outer portions for adjusting the cross sectional area of said element for calibration purposes.

4. An arrangement for reducing the influence of lateral forces on a load receiving element for use in a force transducer for measuring tensile and compressive forces by means of strain gauges connectable to a power source and to an electrical indicating member, said load receiving element comprising a rod provided with a plurality of cavities extending longitudinally thereof and inwardly toward the rod axis, said cavities having a depth such as to intersect with one another and establish therebetween an axially located central rod section integral only at the ends thereof with the end portions of said rod and having all longitudinally extending surface portions spaced laterally from the remaining outer portions of said rod, the end portions of said cavities being of less depth than the central portions thereof and the end portions of said cavities having a progressively changing depth, and the strain gauge means being applied only to a plurality of said surface portions of said central rod section.

5. A load receiving element as defined in claim 4 wherein the depth of said cavities is equal to at least one half the distance between the outer surface of said rod and the longitudinal axis thereof.

6. A load receiving element as defined in claim 4 wherein said central rod section is of polygonal configuration in cross section.

7. A load receiving element as defined in claim 4 wherein said cavities are four in number and extend inwardly at right angles to one another.

8. A load receiving element as defined in claim 4 wherein said rod as a whole is circular in transverse configuration.

9. An arrangement for reducing the influence of lateral forces on a load receiving element for use in a force transducer for measuring tensile and compressive forces by means of strain gauges connectable to a power source and to an electrical indicating member, said load receiving element comprising a rod provided with one pair of oppositely disposed cavities extending longitudinally of said rod, said cavities having a depth of at least one half the distance between the outer surface of said rod and the longitudinal axis thereof and a second pair of oppositely disposed longitudinally extending cavities arranged substantially at right angles to said first pair of cavities, said second pair of cavities having a depth which is less than that of the first pair of cavities and which four cavities produce between their bottom faces a central rod portion and four outer portions between said cavities as seen in a transverse direction, the end portions of said cavities being of less depth than the central portions thereof and the end portions of said cavities having a progressively changing depth, and the strain gauges being disposed only on said central portion of said rod.

References Cited in the file of this patent

UNITED STATES PATENTS

| | | |
|---|---|---|
| 2,414,161 | Moore | Jan. 14, 1947 |
| 2,440,706 | Tint | May 4, 1948 |
| 2,466,034 | Mathews | Apr. 5, 1949 |
| 2,472,047 | Ruge | May 31, 1949 |
| 2,488,347 | Thurston | Nov. 15, 1949 |
| 2,488,348 | Ruge | Nov. 15, 1949 |
| 2,488,349 | Thurston | Nov. 15, 1949 |
| 2,561,318 | Ruge | July 17, 1951 |
| 2,582,886 | Ruge | Jan. 15, 1952 |
| 2,601,781 | Fillion | July 1, 1952 |